United States Patent
Drumm (10) Patent No.: US 9,921,685 B2
(45) Date of Patent: Mar. 20, 2018

(54) TACTILE EFFECT WAVEGUIDE SURFACE FOR OPTICAL TOUCH DETECTION

(71) Applicant: Rapt IP Limited, Mriehel (MT)

(72) Inventor: Owen Drumm, Dublin (IE)

(73) Assignee: Rapt IP Limited, Mriehel (MT)

( * ) Notice: Subject to any disclaimer, the term of this patent is extended or adjusted under 35 U.S.C. 154(b) by 0 days.

(21) Appl. No.: 14/970,482

(22) Filed: Dec. 15, 2015

(65) Prior Publication Data

US 2016/0179261 A1 Jun. 23, 2016

Related U.S. Application Data (60) Provisional application No. 62/091,770, filed on Dec. 15, 2014.

(51) Int. Cl.
*G06F 3/042* (2006.01)

(52) U.S. Cl.
CPC .... *G06F 3/042* (2013.01); *G06F 2203/04109* (2013.01)

(58) Field of Classification Search
CPC .. G06F 3/0308; G06F 3/03545; G06F 3/0412; G06F 3/042; G06F 3/0421; G06F 2203/04109
See application file for complete search history.

(56) References Cited

U.S. PATENT DOCUMENTS

| | | | | |
|---|---|---|---|---|
| 5,942,761 A | * | 8/1999 | Tuli | G06K 7/10722 250/556 |
| 2006/0098004 A1 | * | 5/2006 | Cok | G06F 3/0412 345/207 |
| 2008/0029691 A1 | * | 2/2008 | Han | G06F 3/04883 250/224 |
| 2009/0033637 A1 | * | 2/2009 | Han | G06F 3/0421 345/175 |
| 2010/0001962 A1 | * | 1/2010 | Doray | G06F 3/0317 345/173 |
| 2010/0302210 A1 | * | 12/2010 | Han | G06F 3/0412 345/175 |
| 2012/0212457 A1 | * | 8/2012 | Drumm | G06F 3/0416 345/175 |
| 2012/0212458 A1 | * | 8/2012 | Drumm | G06F 3/042 345/175 |
| 2012/0218229 A1 | * | 8/2012 | Drumm | G06F 3/0421 345/175 |
| 2013/0021302 A1 | * | 1/2013 | Drumm | G06F 3/0421 345/175 |
| 2014/0028629 A1 | * | 1/2014 | Drumm | G06F 3/0308 345/175 |

OTHER PUBLICATIONS

U.S. Appl. No. 13/947,421, filed Jul. 22, 2013, Inventors Owen Drumm et al.

(Continued)

*Primary Examiner* — Joe H Cheng
(74) *Attorney, Agent, or Firm* — Fenwick & West LLP (57) ABSTRACT

An optical touch-sensitive device includes a planar optical waveguide structure having a top surface that includes tactile surface features. This produces a tactile effect experienced by the user using a finger or object (e.g., pen, stylus, or other instrument) on the surface.

25 Claims, 10 Drawing Sheets

(56) References Cited

OTHER PUBLICATIONS

U.S. Appl. No. 13/555,862, filed Jul. 23, 2012, Inventors Owen Drumm et al.
U.S. Appl. No. 61/674,958, filed Jul. 24, 2012, Inventors Owen Drumm et al.
U.S. Appl. No. 61/701,141, filed Sep. 14, 2012, Inventors Owen Drumm et al.
U.S. Appl. No. 61/510,989, filed Jul. 22, 2011, Inventors Owen Drumm et al.
U.S. Appl. No. 15/194,368, filed Jun. 27, 2016, Inventors Owen Drumm et al.
International States Application No. PCT/US13/51596, filed Jul. 23, 2013, Inventors Owen Drumm et al.

* cited by examiner

TACTILE EFFECT WAVEGUIDE SURFACE FOR OPTICAL TOUCH DETECTION

CROSS REFERENCE TO RELATED APPLICATION(S)

This application claims priority under 35 U.S.C. § 119(e) to U.S. Provisional Patent Application Ser. No. 62/091,770, "Tactile Effect Waveguide Surface for Optical Touch Detection," filed Dec. 15, 2014. The subject matter of all of the foregoing is incorporated herein by reference in their entirety.

BACKGROUND

1. Field of Art

This invention generally relates to optical touch detection systems.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. Importantly, the ambiguities must be resolved in a speedy and computationally efficient manner. If too slow, then the technology will not be able to deliver the touch sampling rate required by the system. If too computationally intensive, then this will drive up the cost and power consumption of the technology.

Another drawback is that technologies may not be able to meet increasing resolution demands. Assume that the touch-sensitive surface is rectangular with length and width dimensions L×W. Further assume that an application requires that touch points be located with an accuracy of $\delta l$ and $\delta w$, respectively. The effective required resolution is then $R=(L W)/(\delta l\, \delta w)$. We will express R as the effective number of touch points. As technology progresses, the numerator in R generally will increase and the denominator generally will decrease, thus leading to an overall increasing trend for the required touch resolution R.

Thus, there is a need for improved touch-sensitive systems.

SUMMARY

An optical touch-sensitive device has a surface that produces a tactile effect experienced by the user.

In one aspect, the optical touch-sensitive device includes a planar optical waveguide structure having a top surface that includes tactile surface features (i.e., surface features that can be felt by the user). The device also includes multiple emitters and detectors. The emitters and detectors are arranged along a periphery of the waveguide structure. The emitters produce optical beams that propagate through the waveguide structure via total internal reflection (TIR) to the detectors. Touches on the top surface of the waveguide structure disturb the optical beams, and the touch-sensitive device determines touch events based on the disturbances.

In another aspect, the waveguide structure includes a planar waveguide having a flat, featureless top surface, and a tactile coating on the top surface. The tactile coating has a same index of refraction as the planar waveguide. The tactile coating as a separate layer is applied around the periphery of the waveguide structure, the tactile coating includes a printed material, e.g., a printed graphical border, a pigmented region, or a blocking layer.

Other aspects include components, devices, systems, improvements, methods, processes, applications, computer readable mediums, and other technologies related to any of the above.

BRIEF DESCRIPTION OF DRAWINGS

Embodiments of the present invention will now be described, by way of example, with reference to the accompanying drawings, in which.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A. Device Overview

Figure 1:
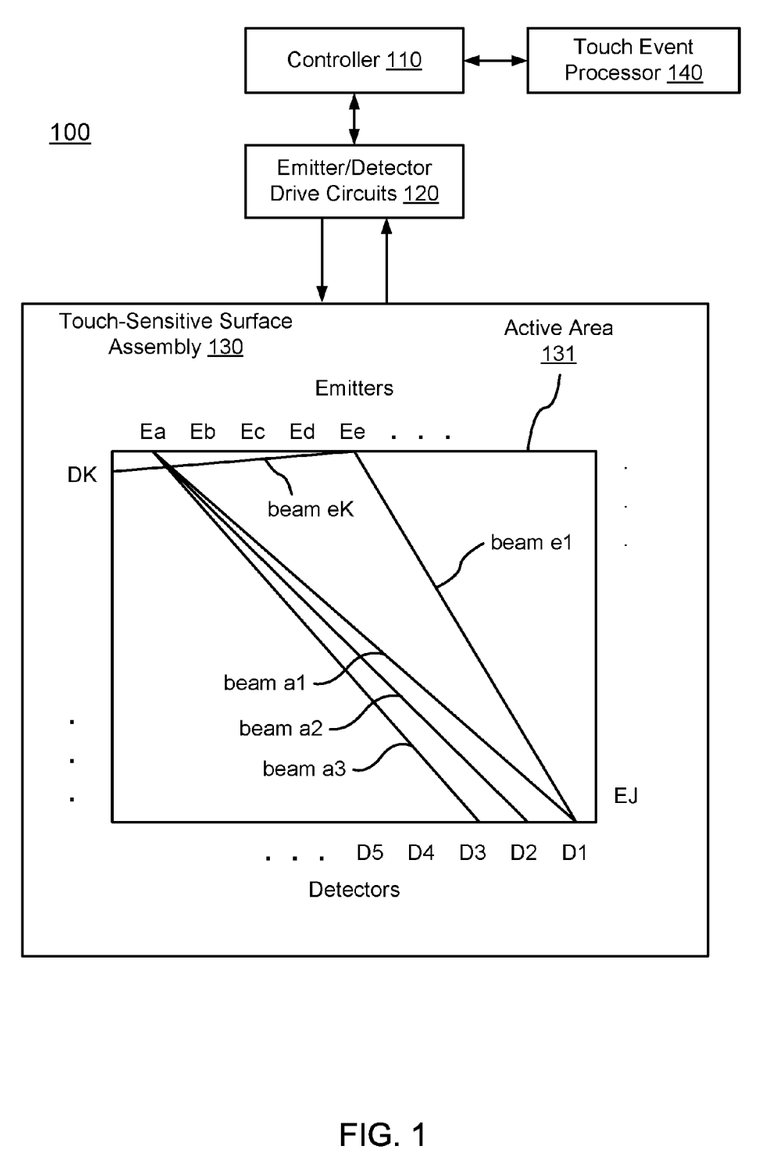
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area 131 may sometimes be referred to as the active area or active surface, even though the active area itself may be an entirely passive structure such as an optical waveguide. The assembly 130 also includes emitters and detectors arranged along the periphery of the active area 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

These touch-sensitive devices can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler zone phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

B. Process Overview

Figure 2:
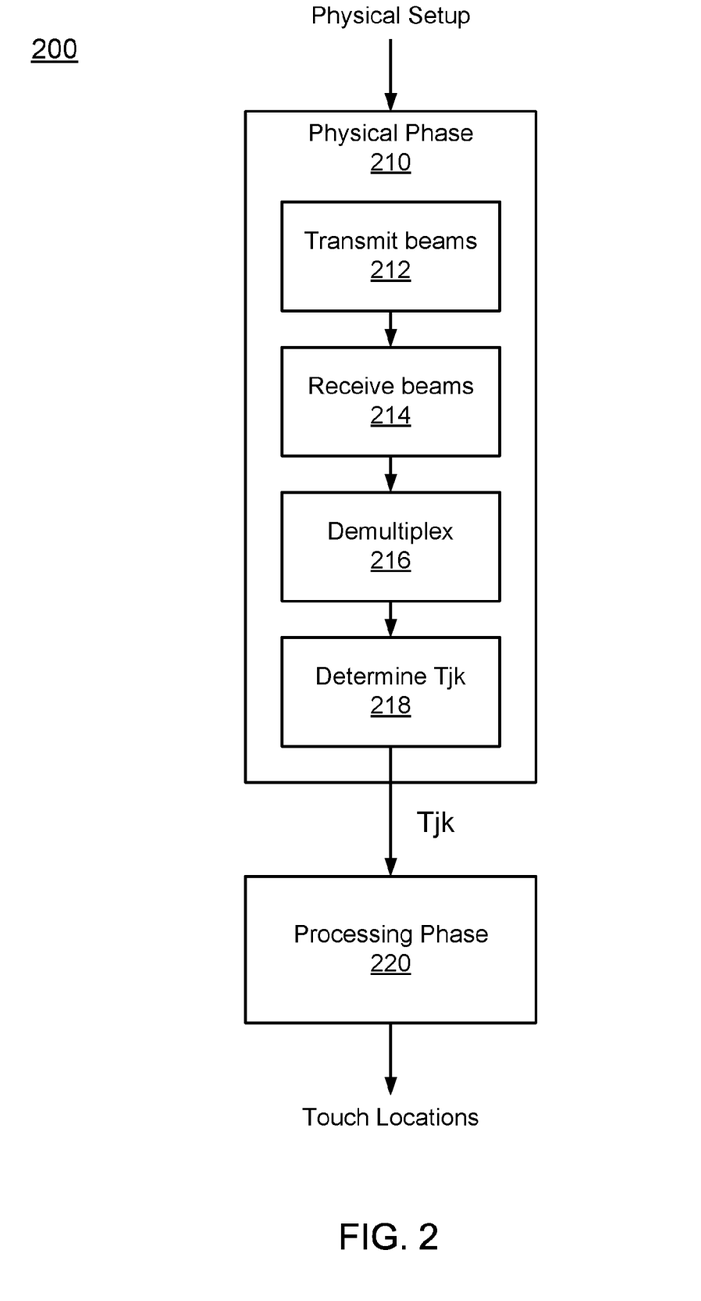
FIG. 2 is a flow diagram for determining the locations of touch events, according to one embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required. Also note that the Tjk may have a temporal aspect.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220.

II. Physical Set-up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

B. Touch Interactions

Figure 3A:
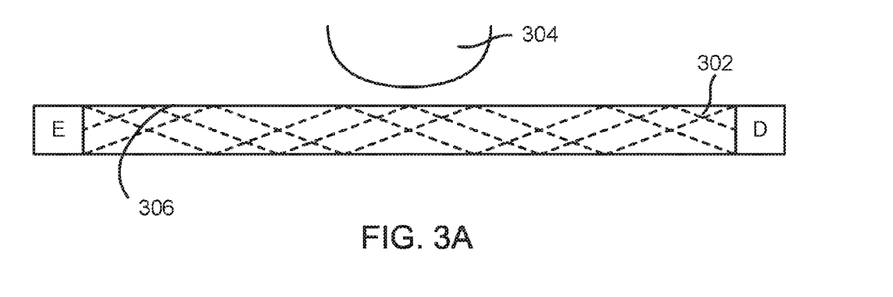
FIGS. 3A-3B illustrate a frustrated TIR mechanism for a touch interaction with an optical beam.
Figure 3B:
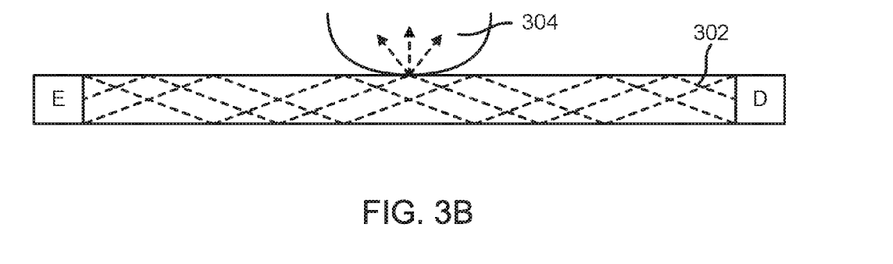

Different mechanisms for a touch interaction with an optical beam can be used. One example is frustrated total internal reflection (TIR). In frustrated TIR, an optical beam is confined to an optical waveguide by total internal reflection and the touch interaction disturbs the total internal reflection in some manner. FIGS. 3A-3B illustrate a frustrated TIR mechanism for a touch interaction with an optical beam. In FIG. 3A, the optical beam, shown as a dashed line, travels from emitter E to detector D through an optically transparent planar waveguide 302. The beam is confined to the waveguide 302 by total internal reflection. The waveguide may be constructed of plastic or glass, for example. In FIG. 3B, an object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3C:
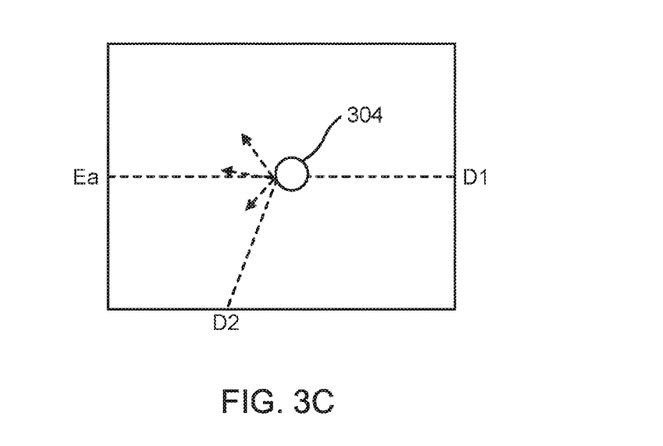
FIG. 3C illustrates a touch interaction with an optical beam enhancing transmission.

Note that some types of touch interactions can be used to measure contact pressure or touch velocity, in addition to the presence of touches. Also note that some touch mechanisms may enhance transmission, instead of or in addition to reducing transmission. FIG. 3C illustrates a touch interaction with an optical beam enhancing transmission. FIG. 3C is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of the optical beams can be external or internal. Examples of sensor elements for the detector include charge coupled devices, photodiodes, photoresistors, phototransistors, and nonlinear all-optical detectors.

The emitters and detectors may also include optics and/or electronics in addition to the main optical source, sensor element. For example, emitters and detectors may incorporate or be attached to lenses to spread and/or collimate emitted or incident light. Additionally, one or more optical coupling assemblies (couplers) of varying design can be used to couple the emitters and detectors to the waveguide. The waveguide, coupler, and any intervening optical elements all have a similar refractive index that is higher than that of air to facilitate TIR throughout the entire optical path of each beam. These elements may be physically coupled together using a bonding agent that has a similar refractive index to the waveguide and coupler. Alternatively, at various points along the optical path air gaps may be present between elements in place of a bonding agent.

D. Optical Beam Paths

Figure 4A:
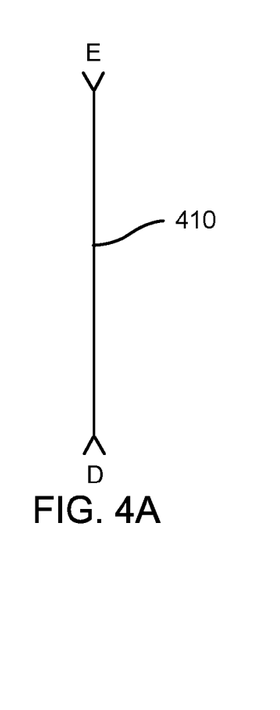
FIGS. 4A-4C are top views of differently shaped beam footprints.
Figure 4B:
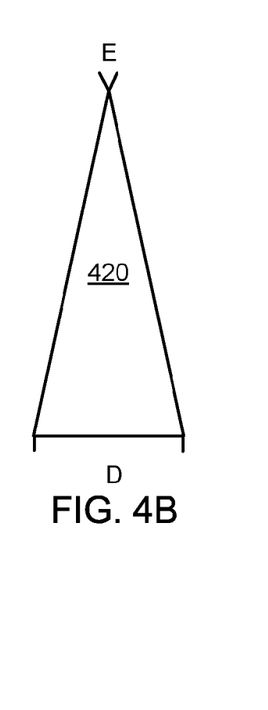
Figure 4C:
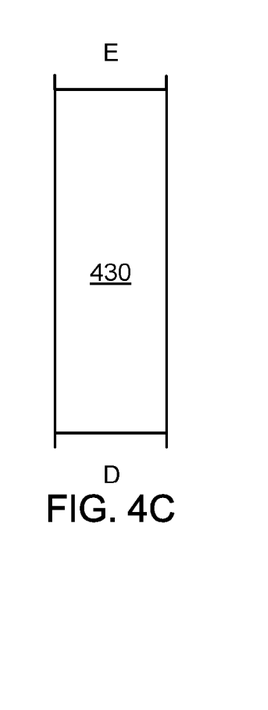

Another aspect of a touch-sensitive system is the shape and location of the optical beams and beam paths. In FIGS. 1-2, the optical beams are shown as lines. These lines should be interpreted as representative of the beams, but the beams themselves may be different shapes and footprints. FIGS. 4A-4C are top views of differently shaped beam footprints. In FIG. 4A, a point emitter and point detector produce a narrow "pencil" beam with a line-like footprint. In FIG. 4B, a point emitter and wide detector (or vice versa) produces a fan-shaped beam with a triangular footprint. In FIG. 4C, a wide emitter and wide detector produces a "rectangular" beam with a rectangular footprint of fairly constant width. Depending on the width of the footprint, the transmission coefficient Tjk behaves as a binary or as an analog quantity. It is binary if the transmission coefficient transitions fairly abruptly from one extreme value to the other extreme value as a touch point passes through the beam. For example, if the beam is very narrow, it will either be fully blocked or fully unblocked. If the beam is wide, it may be partially blocked as the touch point passes through the beam, leading to a more analog behavior.

Beams may have footprints in both the lateral (horizontal) direction, as well as in the vertical direction. The lateral footprint of a beam may be the same or different from the horizontal footprint of a beam.

The direction and spread of the light emitted from the emitters and received by the detectors may vary in spread or angle from beam footprints intended to cover the active area 131. To shape the beams to achieve the intended footprints, lenses may be attached to the emitters and detectors. For example, point emitters and detectors may be used in conjunction with lenses to spread beams in the horizontal or vertical directions.

Figure 5A:
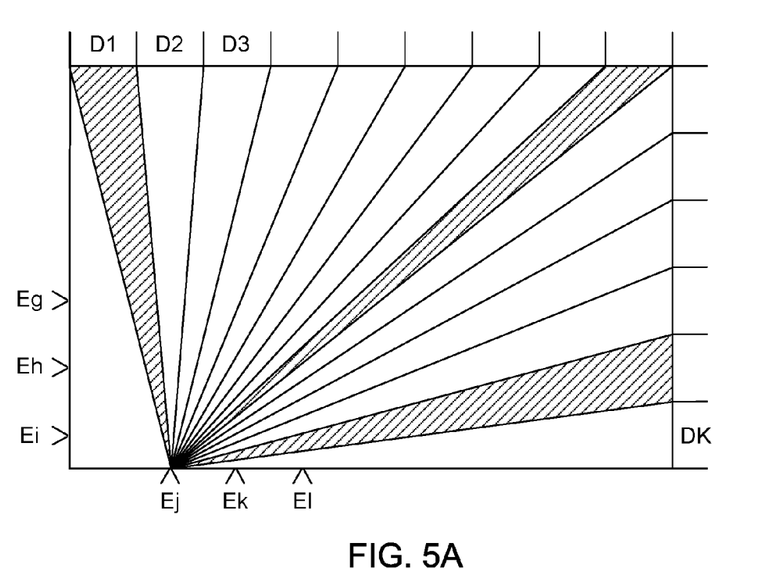
FIGS. 5A-5B are top views illustrating active area coverage by emitters and detectors.
Figure 5B:
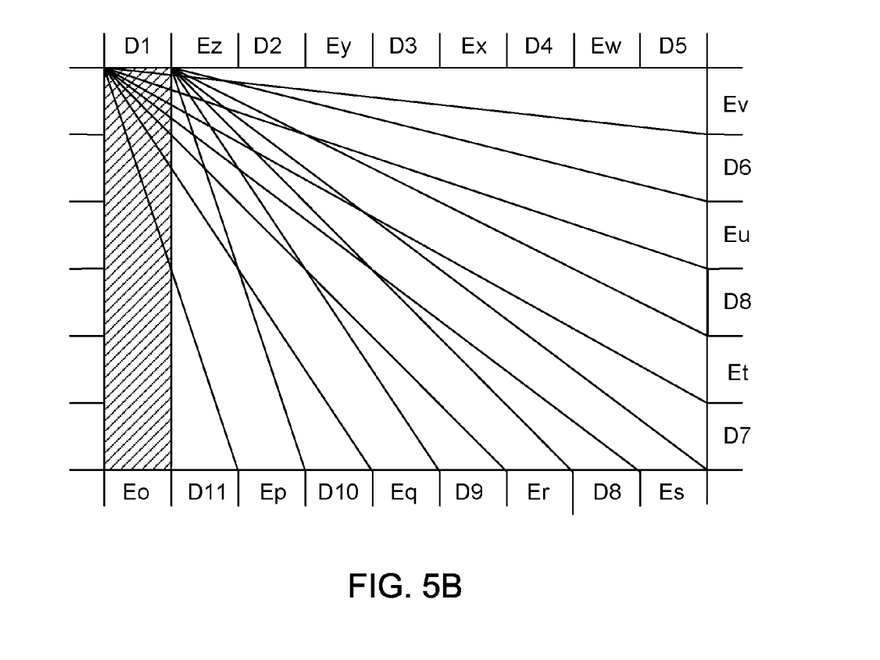

FIGS. 5A-5B are top views illustrating active area coverage by emitters and detectors. As above, the emitters and detectors are arranged along the periphery of the active area. All the emitters may be arranged on two sides of the active area, for example two adjacent perpendicular sides as illustrated in FIG. 5A. Similarly, all of detectors may be arranged on the other two sides of the active area. Alternatively, the emitters and detectors may be mixed or interleaved according to a pattern as illustrated in FIG. 5B. This pattern may be one emitter in between each detector, or another more complicated arrangement.

In most implementations, each emitter and each detector will support multiple beam paths, although there may not be a beam from each emitter to every detector. The aggregate of the footprints from all beams from one emitter (or to one detector) will be referred to as that emitter's (detector's) coverage area. The coverage areas for all emitters (or detectors) can be aggregated to obtain the overall coverage for the system.

The footprints of individual beams can be described using different quantities: spatial extent (i.e., width), angular extent (i.e., radiant angle for emitters, acceptance angle for detectors) and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

The overall coverage area for all emitters should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

The concepts described above for emitters also apply to detectors. A detector's coverage area is the aggregate of all footprints for beams received by the detector.

E. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance $T_{jk}$ is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation. Examples of multiplexing include code division multiplexing, frequency division multiplexing, time division multiplexing. Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams. Several multiplexing techniques may also be used together.

III. Processing Phase

In the processing phase 220 of FIG. 2, the transmission coefficients $T_{jk}$ are used to determine the locations of touch points. Different approaches and techniques can be used, including candidate touch points, line imaging, location interpolation, touch event templates, multi-pass processing and beam weighting.

IV. Waveguide Structure

A. Tactile Surface Features

The active area of the optical touch-sensitive device 100 includes an optical waveguide structure. The waveguide structure may be rigid or flexible. The top surface of the waveguide structure includes tactile surface features, which is experienced by the user. For example, the user may directly feel the tactile surface features as his finger moves across the surface, or the user may indirectly feel the tactile surface features as his stylus moves across the surface. This can give the user some feedback regarding the user's motion across the surface. In some cases, specific features may mark specific locations on the surface, for example the edge or corners or center of the active area. The tactile feedback can then give the user information about his position on the surface.

Figure 6A:
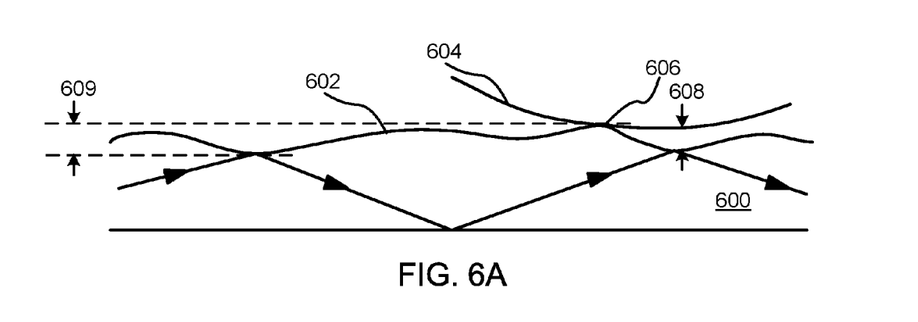
FIG. 6A is a cross sectional diagram showing undulations in the top surface of a waveguide structure, according to one embodiment.

FIGS. 6A-6D show examples of waveguide structures having different types of tactile surface features. FIG. 6A is a cross sectional diagram of a waveguide structure 600 with an undulating top surface 602. Because the undulations are not discontinuous, the top surface 602 has a continuously varying height. Local undulations may be characterized by various parameters, such as the local gradient, local curvature, and local angle of inclination (i.e., angle relative to the flat bottom surface). The undulating top surface may also be characterized by various parameters, including quantities based on the local parameters. Examples include the maximum, average and other statistical quantities (e.g., standard deviation). Thus, an undulating top surface may be characterized by the maximum gradient, or the average and standard deviations of the gradient. The difference 609 in height between the highest point and lowest point (maximum height variation) is another parameter characterizing the surface.

Conversely, certain constraints may be placed on these quantities when designing the top surface 602. Optical beams travel through the waveguide structure 600 using TIR. That is, optical beams which strike the top or bottom surface at greater than the critical angle, will reflect off that surface. If the top and bottom surfaces are parallel, an optical beam will experience TIR indefinitely (in theory). However, the undulations 602 result in a top surface that is not always parallel to the bottom surface.

This results in less efficient TIR compared to a waveguide where the top and bottom surfaces are parallel. First, particularly depending on the construction of the top surface 602, the top surface may cause more scattering. Second, the local inclination of the top surface may cause optical beams to strike at less than the critical angle, thus losing TIR, or to reflect at angles which later will lose TIR.

Third, undulations may reduce the amount of contact between an object 604 and the waveguide structure 600. Touch events on the top surface are detected by frustrated TIR. That is, the evanescent wave from TIR in the waveguide structure is disrupted by an contacting object. This frustrated TIR can occur even when the contacting object is slightly separated from the waveguide structure 600, but increasing the separation will reduce the effect. For example, as shown in FIG. 6A, when the finger 604 touches the local crest 606 of the top surface 602, this prevents the finger from contacting other neighboring points on the top surface 602. In this example, the maximum separation distance 608 is from the finger 604 to a local trough. This distance 608 preferably is small enough that the finger 604 is still within the evanescent field, so that the finger 604 will still disturb the optical beam propagating in the waveguide structure 600.

Figure 6B:
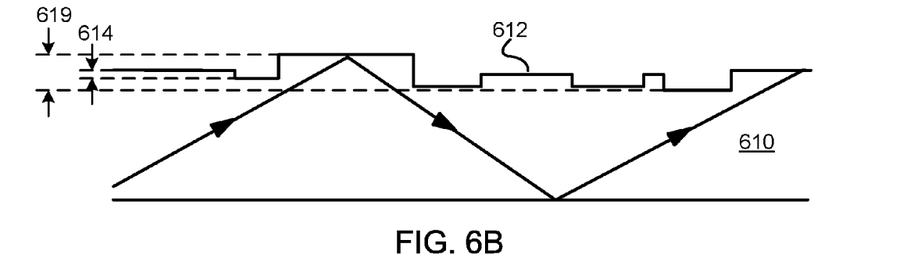
FIG. 6B is a cross sectional diagram showing stepped surface features in the top surface of a waveguide structure, according to one embodiment.
Figure 6C:
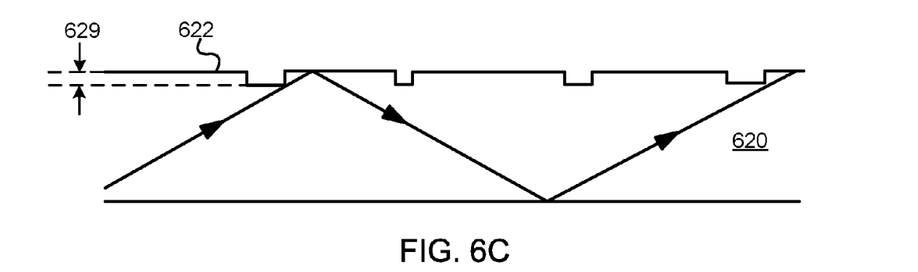
FIG. 6C is a cross sectional diagram showing binary surface features in the top surface of a waveguide structure, according to one embodiment.

FIG. 6B is a cross sectional diagram of a waveguide structure 610, where the top surface 612 has stepped surface features. The surface features are stepped because they have discretely varying step heights. In this example, the steps have many different heights and the heights could even have some element of randomness to their heights, although in other designs the steps may have two, three or another limited number of different heights. For this type of surface, quantities such as gradient and curvature are not as useful. Rather, useful parameters include step height (the difference in height between adjacent steps, such as 614) and maximum height variation 619. In FIG. 6C, the top surface 622 is a binary surface, meaning that it is constructed of steps of two different heights. For a binary surface, the step height and maximum height variation are the same 629.

Stepped surface features can also lead to less efficient TIR, but for different reasons. For example, there is no variation in slope for stepped surfaces. The top surface is always piecewise parallel to the bottom surface. However, the vertical walls between steps can cause vignetting or scattering.

Figure 6D:
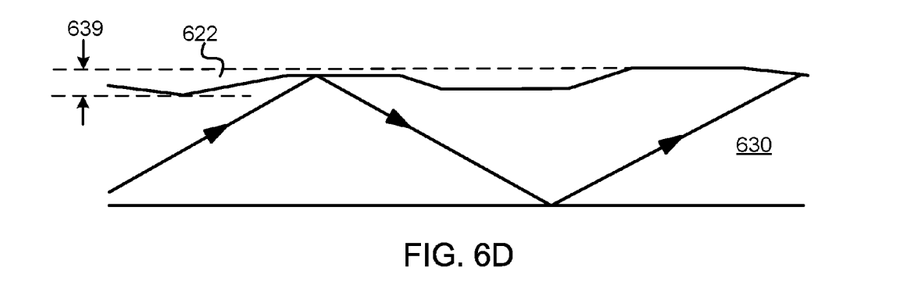
FIG. 6D is a cross sectional diagram showing piecewise flat features in the top surface of a waveguide structure, according to one embodiment.

FIG. 6D is a cross sectional diagram of a waveguide structure 630, where the top surface 632 is piecewise flat. Other variations will be apparent, for example top surfaces which have combinations of the continuously varying features, stepped features and piecewise flat features of FIG. 6.

FIG. 6 shows different types of height variations (variations in z) for tactile surface features. Tactile surface features can also have different lateral designs (in x,y). FIGS. 7A-7F are top views illustrating different types of lateral designs for a binary surface. In these figures, the cross-hatched area represents one step height and the white area represents the other step height. The binary surface is used because it is easiest to illustrate, but these concepts can be extended to other types of surfaces.

The tactile surface features preferably are laterally spaced aperiodically on the top surface and may even have some element of randomness to the spacing. Periodic patterns may result in unwanted interference effects. Aperiodic surface features may also reduce unfavorable interaction with a matrix of pixels on a display which may be below the waveguide structure and also may provide anti-glare function by distributing reflected energy over a range of angles.

Figure 7A:
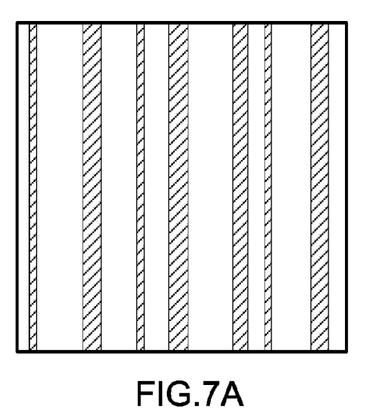
FIGS. 7A-7H are top views of different types of binary surface features.
Figure 7B:
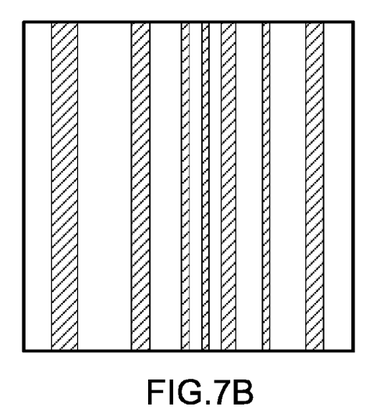

In FIGS. 7A and 7B, the lateral pattern has variations primarily in one direction. In FIG. 7A, relatively narrow stripes are placed to produce variations along a horizontal direction. Some randomness can be added by placing the stripes aperiodically, varying the widths and/or shapes of the stripes (or the intervening white areas) and/or tilting the stripes at slightly different angles. In FIG. 7B, the stripe pattern also contains some information about the location on the surface. The frequency of stripes is higher towards the center of the active area. In another variation, the duty cycle of stripes may vary as a function of location on the surface. There may be a higher percentage of area covered by cross-hatched stripes towards the center of the surface, and a lower percentage toward the edges. Different directions of variation are also possible. The variations may occur left to right on a touch-sensitive surface, or top to bottom on a touch-sensitive surface. Other directionality is also possible (e.g., bottom left to top right).

Figure 7C:
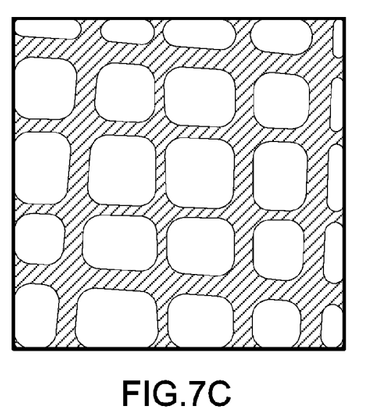
Figure 7D:
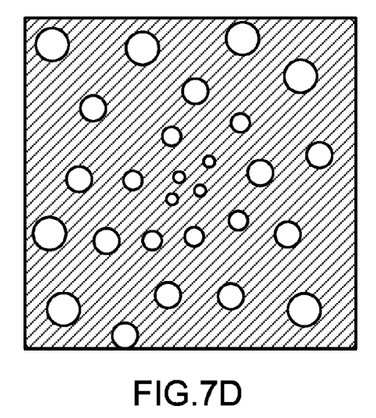
Figure 7E:
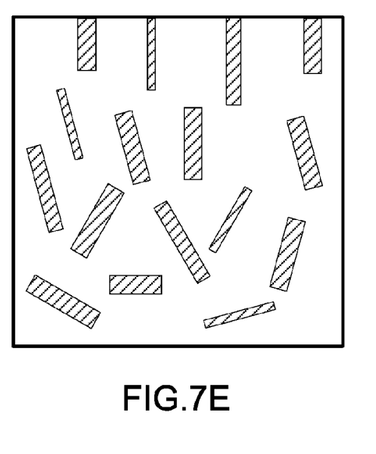
Figure 7F:
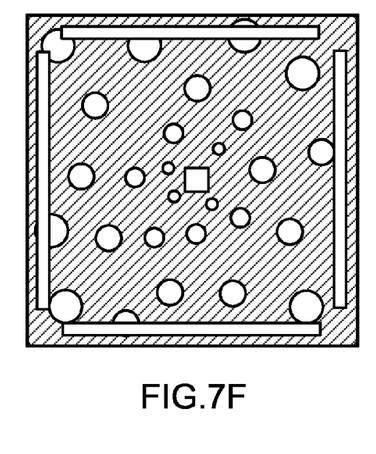

FIGS. 7C-7F show examples of two-dimensional patterns. FIG. 7C is roughly based on two crossed one-dimensional patterns. FIG. 7D is a scattering of circular islands. The islands are not located on a regular grid, but they are roughly increasing in size and spacing moving from the center of the active area to the edge. FIG. 7E is also a scattering of islands, but rectangular in shape and randomly varying in size and orientation. FIG. 7F is a combination of concepts. The basic pattern is similar to FIG. 7D, but there are long rectangles marking the edges and a center square island marking the center.

Figure 7G:
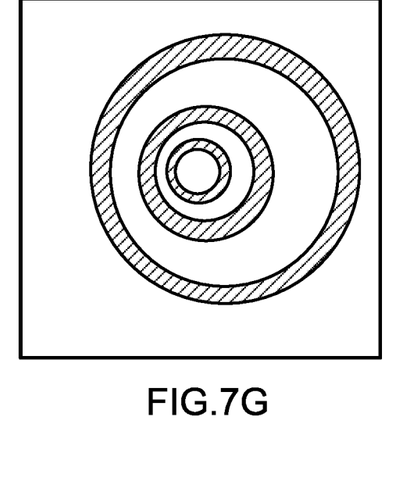
Figure 7H:
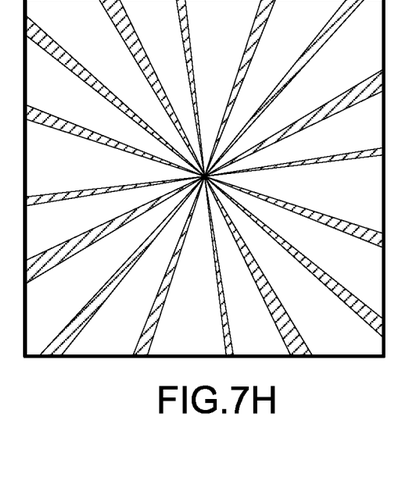

FIGS. 7G-7H show examples based on radial coordinates. In FIG. 7G, the surface features are roughly centered around a common center point. In FIG. 7H, the surface features roughly emanate radially from a common center point.

Patterns based on similar concepts can also be applied to non-binary surfaces. In some implementations, the manufacturing process can impart a directionality to the surface features. Examples of manufacturing processes include hot embossing (particularly for polymer waveguides), molding, machining, and etching (glass waveguides might be treated in this way). The lateral patterns can also be characterized by parameters: size (width, height, diameter), area, spacing, frequency of patterns, percent coverage, etc.

Variation in the top surface of the waveguide structure is usually detrimental to TIR, as undulations or step changes in height of the top surface can create locations for light travelling in the waveguide via TIR to be incident at the top surface of the waveguide at an angle greater than the critical angle of the waveguide. To reduce the effect of the variation of the top surface of the waveguide, the variation in height of the top surface preferably is large enough to be tactilely detected by a human, but otherwise relatively small in height change. For example, if the top surface height undulates, the rate of change of surface angle is restricted to within a threshold rate of change. Alternately, if the top surface height changes in discrete steps, the step change in height is restricted to within a threshold step height. Both of these typically depend on overall optical budget. The loss from a waveguide structure with tactile surface features preferably will not exceed ten times the loss from a flat waveguide (without tactile surface features), and more preferably will not exceed four times that loss.

In one embodiment, the threshold rate of change of the undulations and/or the threshold step height would be less than the distance by which the evanescent wave extends beyond the top surface, so that the contacting object could still interact with the evanescent wave. This distance is typically on the order of a wavelength of light. For an undulating surface, the threshold rate of change of the top surface is selected so that the difference in height between the peak and trough of any given undulation is within an order of magnitude of the wavelength of the light. For a stepped surface, the threshold step height is selected to be within an order of magnitude of the wavelength of the light, and more preferably to be less than a wavelength or even less than half the wavelength. If the touch interaction has some compliance, then more height in the surface features can be accommodated since it will compress upon contact. Preferably, the contact area for a touch is not reduced to less than half what it would be with a flat waveguide (without tactile surface features).

With respect to lateral patterns, the spacing of the lateral patterning (e.g., the lateral distance between peaks of the undulations or the lateral distance between steps) preferably is significantly larger than the wavelengths of light propagating in the waveguide by TIR. For example, in some embodiments, a lateral spacing between tactile surface features is not less than a size of a typical human finger. However, it preferably is also small enough to produce the desired tactile effect. For example, in some embodiments, an average lateral size of the tactile surface features is less than a size of a typical human finger but greater than a wavelength of the optical beams. If there is a display module underneath the waveguide structure (as in FIGS. 8 and 9), then the lateral size of the tactile surface features may also depend on the pixel size of the display module. For large display modules, preferably, the tactile surface features will be much smaller than a display pixel so that distortion of the displayed image is reduced. Typical pixel sizes range from approximately 50 μm to approximately 500 μm on a side.

B. Multi-part Waveguide Structure

In some implementations, the waveguide structure is constructed from multiple parts. In one approach, the waveguide structure includes a planar waveguide having a flat, featureless top surface (i.e., flat, parallel top and bottom surfaces), with a tactile coating on the top surface of the planar waveguide. The tactile coating has a matching index of refraction to the planar waveguide. In some embodiments, the tactile coating is a tactile film (e.g., an optically transmissive film) having tactile surface features. The tactile coating may be manufactured using the above methods (or suitable alternative methods) and then affixed to the flat, featureless top surface of the waveguide structure. For example, an optically transmissive film may be applied as a solid layer to the planar waveguide. Alternately, it may be applied as a liquid which is then cured into a layer with the surface features. In some implementations, the tactile coating is applied as a separate layer around the periphery of the waveguide structure. The tactile coating may include printed material, e.g., a printed graphical border, a pigmented region, or a blocking layer.

Figure 8:
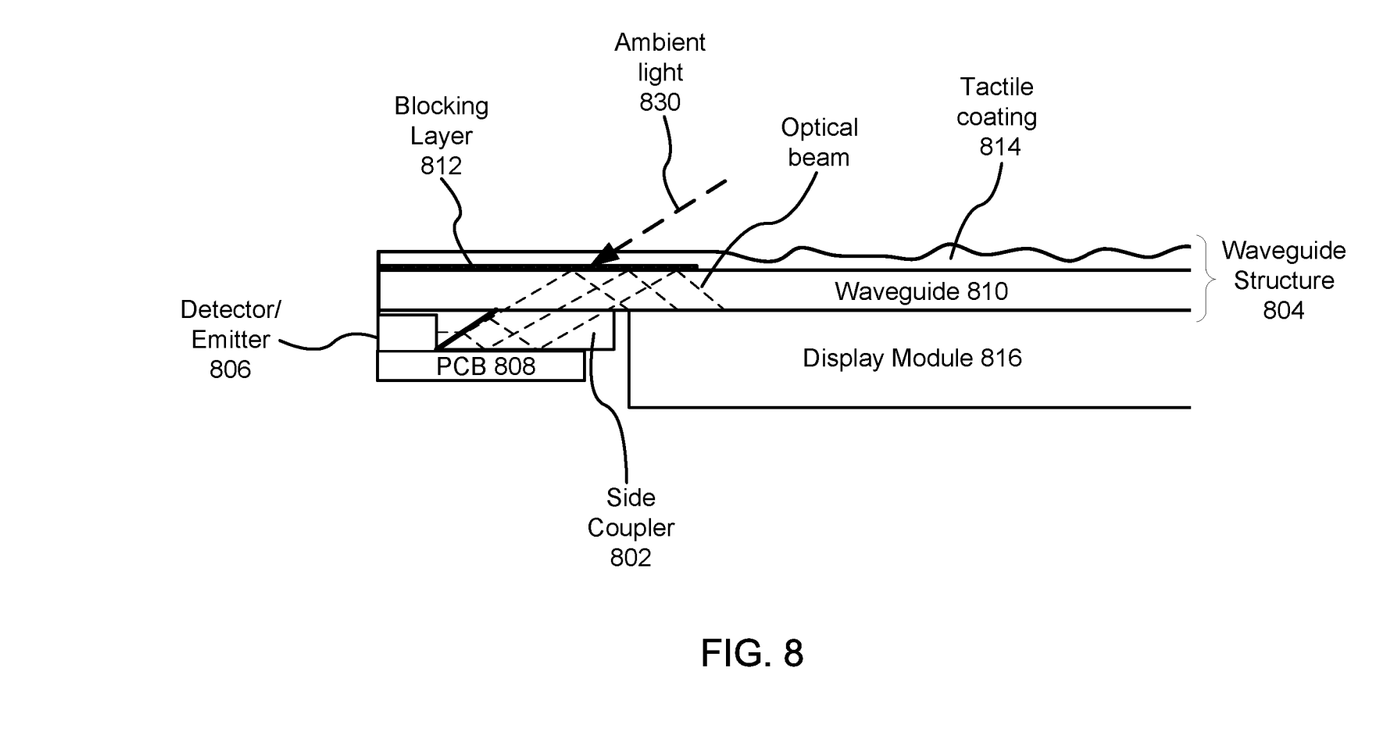
FIG. 8 is a side view of an optical touch-sensitive device having a side coupler and a waveguide structure and blocking layer.

FIG. 8 is a side view of an optical touch-sensitive device 800 having a side coupler 802 and a waveguide structure 804 and blocking layer 812. The waveguide structure 804 includes a planar waveguide 810 having a flat, featureless top surface and also includes a tactile coating 814. In the example of FIG. 8, a blocking layer 812 is interposed between the top surface of the planar waveguide 810 and the underside of the tactile coating 814. In other embodiments, the blocking layer 812 may be located on top of the tactile coating 814, rather than underneath it. Alternately, there may be no tactile coating 814 in this area, with the blocking layer 812 located directly on top of the planar waveguide 810.

The waveguide structure 804 is optically coupled to the emitters and detectors 806 by an optical coupler assembly (or coupler) 802. The detectors and emitters 806 are oriented to receive and emit light, respectively, in a direction parallel to the top and bottom surfaces of the waveguide structure 804, such that light exits the emitters and enters the detectors in substantially the same lateral direction as the propagation direction within the waveguide structure 804. In FIG. 8, the coupler 802 is side coupled to the bottom surface of the waveguide structure 804. The optical touch-sensitive device 800 may also include a printed circuit board (PCB) 808 and a display module 816. In this example, both the waveguide 810 and the coating 814 extend past the active area of the touch-sensitive surface.

The blocking layer 812 blocks ambient light 830 from reaching the emitter/detectors 806. The transition from the tactile coating 814 over the active area to the material over the blocking layer 812 is preferably level, so that no tactile boundary can be felt. The coating 814 over the blocking layer 812 may be smooth, rather than intentionally tactile. In one implementation, the blocking layer 812 is opaque to both visible light as well as the IR optical beams. For example, the blocking layer 812 may be a reflective layer to reflect away the ambient light 830. Alternately, the blocking layer 812 may be an absorbing layer that absorbs the external light. The tactile coating 814 allows the blocking layer 812 to be moved to the top surface of the waveguide 810 without introducing a tactile edge due to the blocking layer. This, in turn, allows for greater design freedom in the detectors, emitters and couplers.

Figure 9:
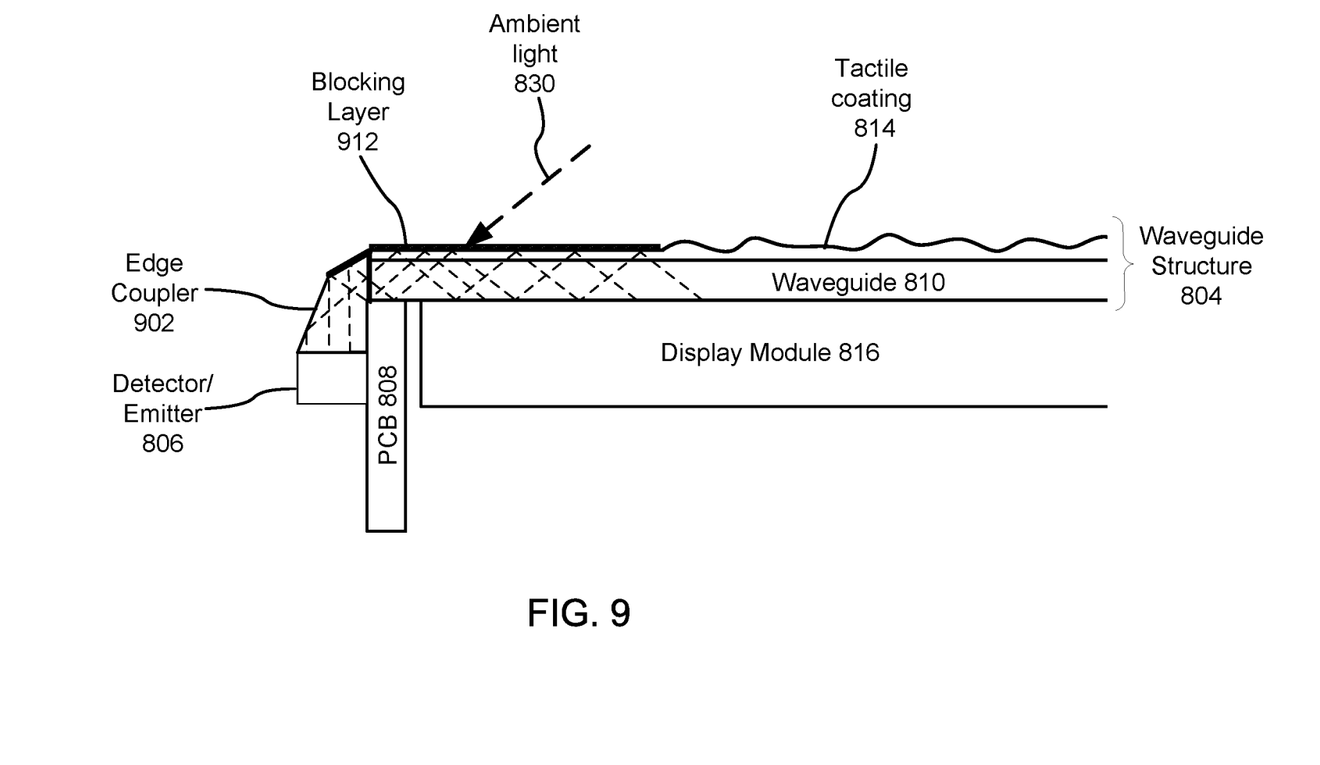
FIG. 9 is a side view of an optical touch-sensitive device having an edge coupler and a waveguide structure and blocking layer.

FIG. 9 is a side view of an optical touch-sensitive device having an edge coupler 902 and a waveguide structure 804 and blocking layer 912. Compared with FIG. 8, the detectors and emitters 806 are oriented to receive and emit light, respectively, in a direction perpendicular to the top and bottom surfaces of the waveguide 810, such that light exits the emitter in a direction rotated by ninety degrees with respect to the propagation direction in the waveguide structure 804. The coupler 902 is edge coupled to a side edge surface of the waveguide structure 804. In this example, the blocking layer 912 is located on top of the coating 814, rather than between the coating 814 and waveguide 810 as shown in FIG. 8.

V. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An optical touch-sensitive device comprising:
a planar optical waveguide structure, the waveguide structure having a top surface that includes tactile surface features, wherein the waveguide structure comprises:
  a planar waveguide having a flat, featureless top surface, and
  a tactile coating on top of the flat, featureless top surface of the planar waveguide, the tactile coating having a same index of refraction as the planar waveguide; and
emitters and detectors arranged along a periphery of the waveguide structure, the emitters producing optical beams that propagate through the waveguide structure via total internal reflection (TIR) to the detectors, wherein touches on the top surface of the waveguide structure disturb the optical beams, the touch-sensitive device determining touch events based on the disturbed optical beams.

2. The optical touch-sensitive device of claim 1 wherein the tactile surface features are undulations in the top surface.

3. The optical touch-sensitive device of claim 1 wherein the top surface is a surface of continuously varying height.

4. The optical touch-sensitive device of claim 3 wherein the top surface has a maximum difference in height from peak to trough of not more than an order of magnitude more than a wavelength of light in the optical beams.

5. The optical touch-sensitive device of claim 1 wherein the tactile surface features are stepped surface features.

6. The optical touch-sensitive device of claim 1 wherein the top surface is a binary surface.

7. The optical touch-sensitive device of claim 6 wherein the binary surface has a step height of not more than a wavelength of light in the optical beams.

8. The optical touch-sensitive device of claim 1 wherein the tactile surface features are laterally spaced aperiodically on the top surface.

9. The optical touch-sensitive device of claim 1 wherein the tactile coating is a tactile film.

10. The optical touch-sensitive device of claim 1 further comprising:
a blocking layer on top of the flat, featureless top surface of the planar waveguide along a periphery of an active area over which touch events are detectable, the blocking layer blocking ambient light from reaching the detectors.

11. The optical touch-sensitive device of claim 10 wherein the blocking layer is level with the tactile coating so that no tactile boundary is present between the blocking layer and the tactile coating.

12. An optical touch-sensitive device comprising:
a planar optical waveguide structure, the waveguide structure having a top surface that includes tactile surface features, wherein the top surface is a surface of continuously varying height and has a varying height such that a contact area of a touch on the top surface is not less than half the contact area of the same touch on a flat surface without tactile surface features; and
emitters and detectors arranged along a periphery of the waveguide structure, the emitters producing optical beams that propagate through the waveguide structure via total internal reflection (TIR) to the detectors, wherein touches on the top surface of the waveguide structure disturb the optical beams, the touch-sensitive device determining touch events based on the disturbed optical beams.

13. An optical touch-sensitive device comprising:
a planar optical waveguide structure, the waveguide structure having a top surface that includes tactile surface features, wherein the tactile surface features are stepped surface features and the stepped surface features have a maximum step height of not more than a wavelength of light in the optical beams; and
emitters and detectors arranged along a periphery of the waveguide structure, the emitters producing optical beams that propagate through the waveguide structure via total internal reflection (TIR) to the detectors, wherein touches on the top surface of the waveguide structure disturb the optical beams, the touch-sensitive device determining touch events based on the disturbed optical beams.

14. The optical touch-sensitive device of claim 13 wherein the stepped surface features have a maximum step height of not more than half a wavelength of light in the optical beams.

15. An optical touch-sensitive device comprising:
a planar optical waveguide structure, the waveguide structure having a top surface that includes tactile surface features, wherein a lateral spacing between tactile surface features is not less than a size of a typical human finger; and
emitters and detectors arranged along a periphery of the waveguide structure, the emitters producing optical beams that propagate through the waveguide structure via total internal reflection (TIR) to the detectors, wherein touches on the top surface of the waveguide structure disturb the optical beams, the touch-sensitive device determining touch events based on the disturbed optical beams.

16. An optical touch-sensitive device comprising:
a planar optical waveguide structure, the waveguide structure having a top surface that includes tactile surface features, wherein an average lateral size of the tactile surface features is less than a size of a typical human finger but greater than a wavelength of the optical beams; and
emitters and detectors arranged along a periphery of the waveguide structure, the emitters producing optical beams that propagate through the waveguide structure via total internal reflection (TIR) to the detectors, wherein touches on the top surface of the waveguide structure disturb the optical beams, the touch-sensitive device determining touch events based on the disturbed optical beams.

17. The optical touch-sensitive device of claim 16 wherein the tactile surface features have a lateral size that is less than a pixel size for an underlying display module.

18. An optical touch-sensitive device comprising:
a planar optical waveguide structure, the waveguide structure having a top surface that includes tactile surface features, wherein the waveguide structure has an optical loss that is not more than ten times an optical loss of a flat waveguide structure without tactile surface features; and
emitters and detectors arranged along a periphery of the waveguide structure, the emitters producing optical beams that propagate through the waveguide structure via total internal reflection (TIR) to the detectors, wherein touches on the top surface of the waveguide structure disturb the optical beams, the touch-sensitive device determining touch events based on the disturbed optical beams.

19. The optical touch-sensitive device of claim 18 wherein the waveguide structure has an optical loss that is not more than four times an optical loss of a flat waveguide structure without tactile surface features.

20. The optical touch-sensitive device of claim 18 wherein the tactile surface features are undulations in the top surface.

21. The optical touch-sensitive device of claim 18 wherein the top surface is a surface of continuously varying height.

22. The optical touch-sensitive device of claim 21 wherein the top surface has a maximum difference in height from peak to trough of not more than an order of magnitude more than a wavelength of light in the optical beams.

23. The optical touch-sensitive device of claim 21 wherein the tactile surface features are stepped surface features.

24. The optical touch-sensitive device of claim 21 wherein the top surface is a binary surface.

25. The optical touch-sensitive device of claim 21 wherein the tactile surface features are laterally spaced aperiodically on the top surface.

* * * * *